United States Patent [19]
Theobald et al.

[11] Patent Number: 5,936,795
[45] Date of Patent: Aug. 10, 1999

[54] MAGAZINE CASSETTE LOCKING DEVICE

[75] Inventors: William Theobald, Newport Beach, Calif.; Barry C. Kockler, Lewisville, Tex.; James L. Rogers, Irving, Tex.; Raymond D. Heistand, II, Lewisville, Tex.; Robert W. Ridout, Corinth, Tex.

[73] Assignee: Seagate Technology, Inc., Scotts Valley, Calif.

[21] Appl. No.: 08/811,677

[22] Filed: Mar. 5, 1997

[51] Int. Cl.[6] ........................... G11B 15/68; G11B 17/22
[52] U.S. Cl. ................... 360/92; 369/36; 369/178
[58] Field of Search .................. 360/92; 369/34, 369/36, 38, 178, 191, 194

[56] References Cited

U.S. PATENT DOCUMENTS

| 5,021,902 | 6/1991 | Ishikawa et al. | 360/92 |
| 5,182,687 | 1/1993 | Campbell | 360/92 |
| 5,264,974 | 11/1993 | Campbell et al. | 360/92 |
| 5,402,285 | 3/1995 | Theobald, Jr. et al. | 360/69 |
| 5,537,268 | 7/1996 | Felde et al. | 360/92 |

FOREIGN PATENT DOCUMENTS

| 2-81352 | 3/1990 | Japan . |
| 5-12821 | 1/1993 | Japan . |
| 6-309765 | 11/1994 | Japan . |

*Primary Examiner*—William J. Klimowicz
*Attorney, Agent, or Firm*—Fliesler, Dubb, Meyer & Lovejoy LLP

[57] ABSTRACT

A device for positively restraining data tape cassettes within a magazine of a cassette loading assembly to prevent the cassettes from becoming dislodged from the magazine when the cassettes are not engaged within the tape drive. The device includes a spring loaded cantilever having an end section which engages a detent conventionally formed in the edge portion of the data cassette tape. When the cantilever end section is engaged in the detent, the cassette tape is securely held against a rear interior wall of the magazine. The spring loaded cantilever is pivotally mounted by a shaft to an interior side wall of the magazine. In operation, a cassette transfer system engages the tape cassette to load the cassette into the tape drive. However, prior to such engagement, a bracket mounted on the cassette transfer system contacts a load-receiving end of the cantilever opposite the end section within the cassette tape detent. The bracket biases the load-receiving end inward toward the cassette, thereby pivoting the opposite end section out of the detent. Once the end section is removed from the detent, the cassette tape may be freely loaded into the tape drive.

12 Claims, 11 Drawing Sheets

MAGAZINE CASSETTE LOCKING DEVICE

BACKGROUND OF THE INVENTION

1. Field of the Invention

The present invention relates to a cassette loading assembly for loading a plurality of tape cassettes into a tape drive, and more particularly, to a device for positive restraint of a cassette within a magazine of the tape loading assembly, which device may be disengaged to allow loading of the cassette from the magazine to the tape drive.

2. Description of the Related Art

Conventional digital audio tape (DAT) cassettes for 5¼ inch form factor tape drives, such as an R-DAT tape cassette marketed by Conner Tape Division, Costa Mesa, Calif., can store up to approximately 5 to 10 gigabytes of data. However, many applications, including archival storage, journaling, on-line and background storage, and the unattended back-up of large amounts of data, may require storage of several times that amount of data. When backing up a data source of more than 10 gigabytes, it is necessary to frequently change the cassette tape in a cassette drive, generally about once every few hours. Since most such backing up is done outside of normal work hours to avoid tying up the computer holding the data, it is often not convenient to change the data tape. Thus, cassette loading systems have been developed which are capable of holding a plurality of data tape cassettes for loading automatically into a tape drive. The system includes a storage magazine comprising a plurality of cassette bays where the tapes are held for loading into the tape drive, and a loader which accomplishes the transfer of the cassette tapes from the cassette bays into the drive. An example of such a tape loading system has been developed by Predator Systems Corporation under the name Data Hawk I, which holds up to eight, 4 mm DAT cassettes for loading and unloading to a 4 mm DAT cassette drive.

A disadvantage to conventional cassette magazines is that the cassette tapes may be dislodged from the cassette bays if the magazine is mishandled. Moreover, when the magazine is in operation with a tape drive, a shock to the magazine or the drive may cause one or more of the cassette tapes to become partially or completely dislodged, thereby potentially causing errors or shut-down of an unattended system.

SUMMARY OF THE INVENTION

It is therefore an object of the present invention to provide a device for locking a cassette within a cassette bay of a magazine when the cassette is not engaged within the tape drive.

It is a further object of the present invention to provide a device for releasing an individual cassette when the cassette is loaded from the magazine into the tape drive.

It is another object of the present invention to provide a magazine which prevents cassettes other than the one loaded into the tape drive from being released from the magazine.

It is a still further object of the present invention to provide a clean and simple restraining device design which may operate with conventional magazines and data tapes.

These and other objects are accomplished by the present invention which relates to a device for positively restraining data tape cassettes within a magazine to prevent the cassettes from becoming dislodged from the magazine when the cassettes are not engaged within the tape drive. The device includes a spring loaded cantilever having an end section which engages a detent conventionally formed in the rear portion of a side of a data cassette tape. When the cantilever end section is engaged in the detent, the cassette is securely held against a rear interior wall of the magazine. The cantilever further includes a load-receiving end opposite the end section. A force exerted on the load-receiving end of the cantilever will bias the end section out of the detent in the cassette, to thereby allow the cassette to be removed from the cassette bay. Thus, a cassette will remain locked within a cassette bay unless the end section of the cantilever is manually biased out of the detent, or when the cassette is to be loaded into a tape drive by the cassette loading assembly as explained below.

The cassette loading assembly includes a cassette transfer assembly for loading a cassette from the magazine into the tape drive. Rotating pinch rollers are provided as part of the transfer assembly on opposite sides of a cassette loader to load a tape from the magazine into the tape drive. When a cassette is to be loaded, the transfer assembly moves the pinch rollers inward to engage the sides of a cassette tape. Once in contact with the cassette, the pinch rollers rotate against the sides of the cassette tape to urge the tape into the tape drive slot.

According to the present invention, the transfer assembly further includes a bracket mounted adjacent to a pinch roller on one or both sides of the magazine. The bracket moves with the pinch roller so that, as the pinch roller is swung inward from a side of the magazine, the bracket engages the load-receiving end of the cantilever to thereby pivot the opposite end section of the cantilever out of the detent. After the end section is removed from the detent, the cassette tape is freely loaded into the tape drive by the pinch rollers against the sides of the cassette tape. After the tape is loaded, the bracket remains in contact with the load-receiving end of the cantilever while the cassette is in the tape drive.

When a cassette tape is removed from the drive, the pinch rollers, rotating in an opposite direction than for cassette insertion, bias the cassette out of the drive. Once the cassette is restored to the magazine, the transfer assembly swings the pinch rollers away from the sides of the cassette, and the bracket is moved away from the load-receiving end of the cantilever. The end section of the spring loaded cantilever is thereupon biased to once again engage the cassette detent.

Each cassette bay in the magazine is provided with one or two locking devices according to the present invention. Thus, while the locking device in one cassette bay is disengaged to load the cassette tape contained therein into the tape drive, the remainder of the cassettes in the magazine are restrained within their respective cassette bays.

In a further aspect of the present invention, the magazine may include means for allowing only one cassette to be dislodged at a given time. In a preferred embodiment, a column is provided within each cassette bay and extending the entire length of the magazine. The column is hollow, with a plurality of slots, one slot for each cassette bay in the magazine. The slots are sized and provided with respect to the cassette locking devices such that, when an end section of a cantilever is pivoted out of a detent, an extension fixedly provided on the end section is received through a corresponding slot and into the interior of the column.

The column is filled with a single row of ball bearings. There is enough space within the interior of the column for any pair of ball bearings to separate a sufficient distance to accept an extension on the cantilever therebetween. However, the combined height of the ball bearings within the sealed column is such that, when one extension is in the column between a pair of ball bearings, there is insufficient space for a second pair of ball bearings to separate to accept a second extension into the interior. Thus, only one extension may be received within the column at a given time. An extension enters the column as result of a cantilever pivoting the end section out of the cassette detent. However, unless a cantilever can pivot sufficiently such that the extension on that cantilever is positioned within the column, the cantilever end section will not fully pivot out of the detent in which it is engaged, and the cassette will remain locked in the magazine. In this way, only one cassette, for example the cassette loaded within the tape drive, may be removed from the magazine at a given time. Of course, the column may be removed from the magazine to change or otherwise remove as many cassettes as is desired.

BRIEF DESCRIPTION OF THE DRAWINGS

The invention will now be described with reference to the drawings, in which:

FIG. 1b is a side view of the tape drive loading mechanism shown in FIG. 1a;

DETAILED DESCRIPTION OF A PREFERRED EMBODIMENT

The invention will now be described with reference to FIGS. 1–11c, which generally disclose a locking device for positive restraint of a cassette tape within a magazine of a cassette loading assembly. It is understood that the locking device according to the present invention may operate with cassette tapes and cassette loading assemblies of various known sizes and configurations.

Figure 1A:
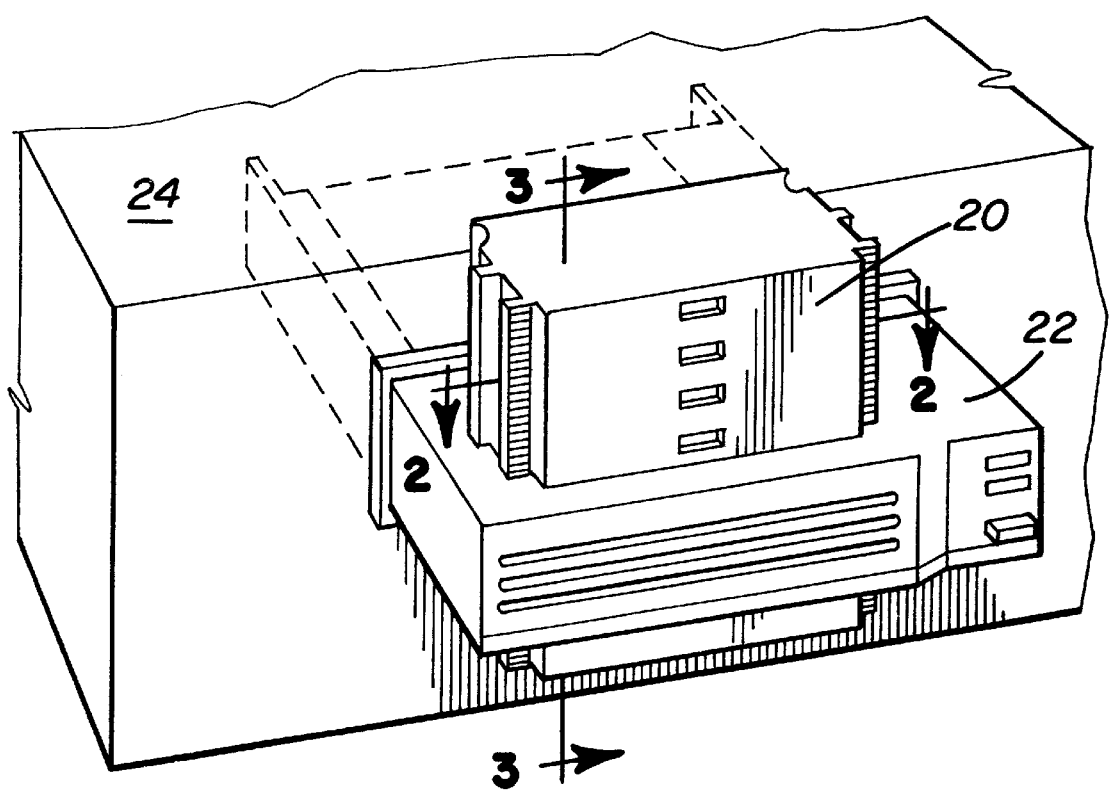
FIG. 1a is a perspective view of a tape drive loading mechanism operating with a tape drive.
Figure 1B:
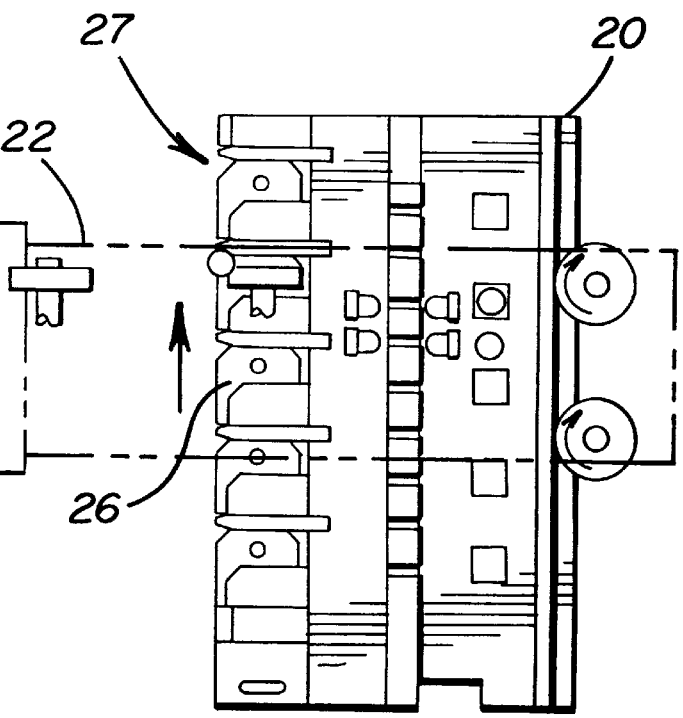

Cassette loading assemblies are well known in the art for loading a plurality of cassette tapes into a tape drive. One such device is disclosed in U.S. Pat. No. 5,264,974 entitled CASSETTE LOADING SYSTEM by Theobald et al., which application is assigned to the owner of the present invention and incorporated herein by reference. As shown in FIGS. 1a and 1b, a cassette loading assembly as in U.S. Pat. No. 5,264,974 includes a magazine 20 translationally mounted for vertical movement within a loader 22. Loader 22 is mounted adjacent to a drive slot of tape drive 24. As described in U.S. Pat. No. 5,264,974, mechanical and electronic devices are provided for proper vertical positioning of magazine 20 so that a desired data tape cassette 26 may be aligned and received within tape drive 24 for the transfer of data between a data tape within cassette 26 and a read/write element (not shown) within drive 24.

Figure 1C:
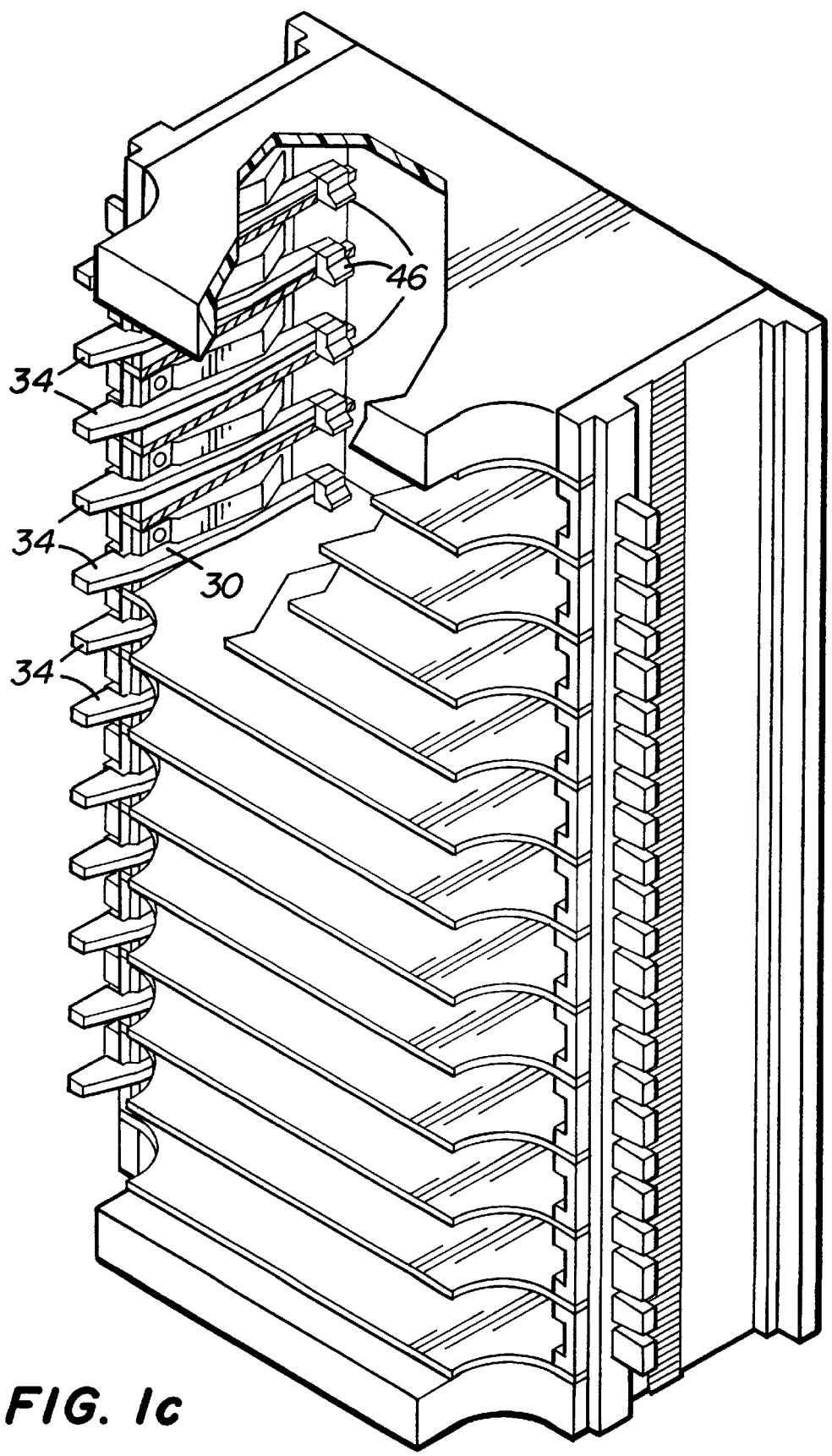
FIG. 1c is a cut-away perspective view of a magazine including the locking device of the present invention.

As best seen in FIG. 1c, magazine 20 includes a plurality of cassette bays 27, each for housing a cassette 26. In one embodiment of the present invention, magazine 20 preferably has four cassette bays 27. In an alternative embodiment, the magazine 20 may have twelve cassette bays 27. It is understood, however, that the magazine may include more or less than four or twelve cassette bays. A cassette bay 27 includes an open forward end facing the tape drive 24, a rear face opposed to the forward end, and a pair of spaced apart side walls extending between the forward end and the rear face. The cassette bay 27 is provided with a size so that a conventional DAT cassette for a 5¼ inch form factor tape drive fits snugly therein. It is understood, however, that the present invention may operate in cassette bays formed to various sizes to accept cassette tapes of various form factors and configurations.

Figure 2:
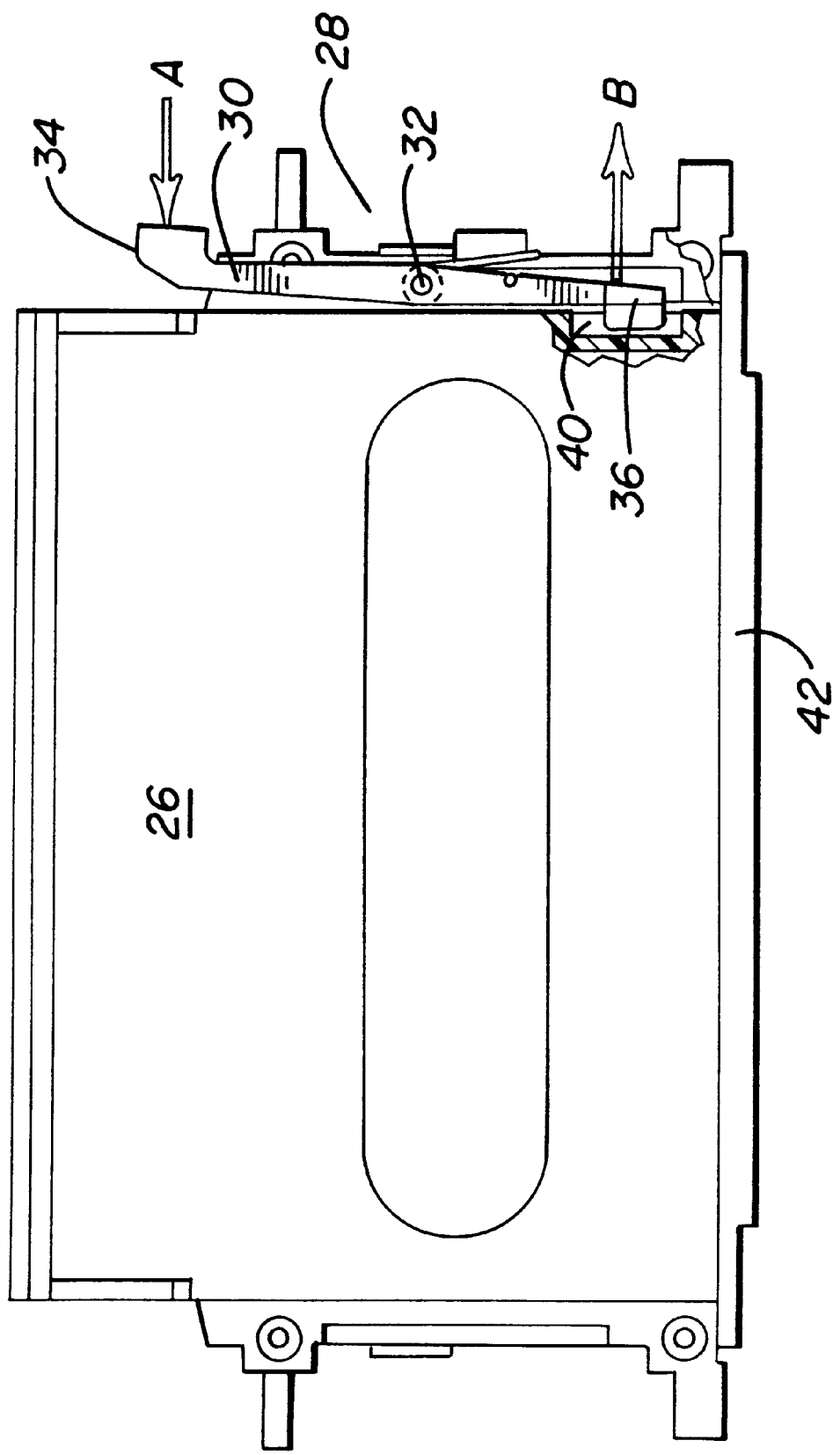
FIG. 2 is a cross-sectional top view through line 2—2 of FIG. 1a showing the locking device of the present invention.
Figure 3:
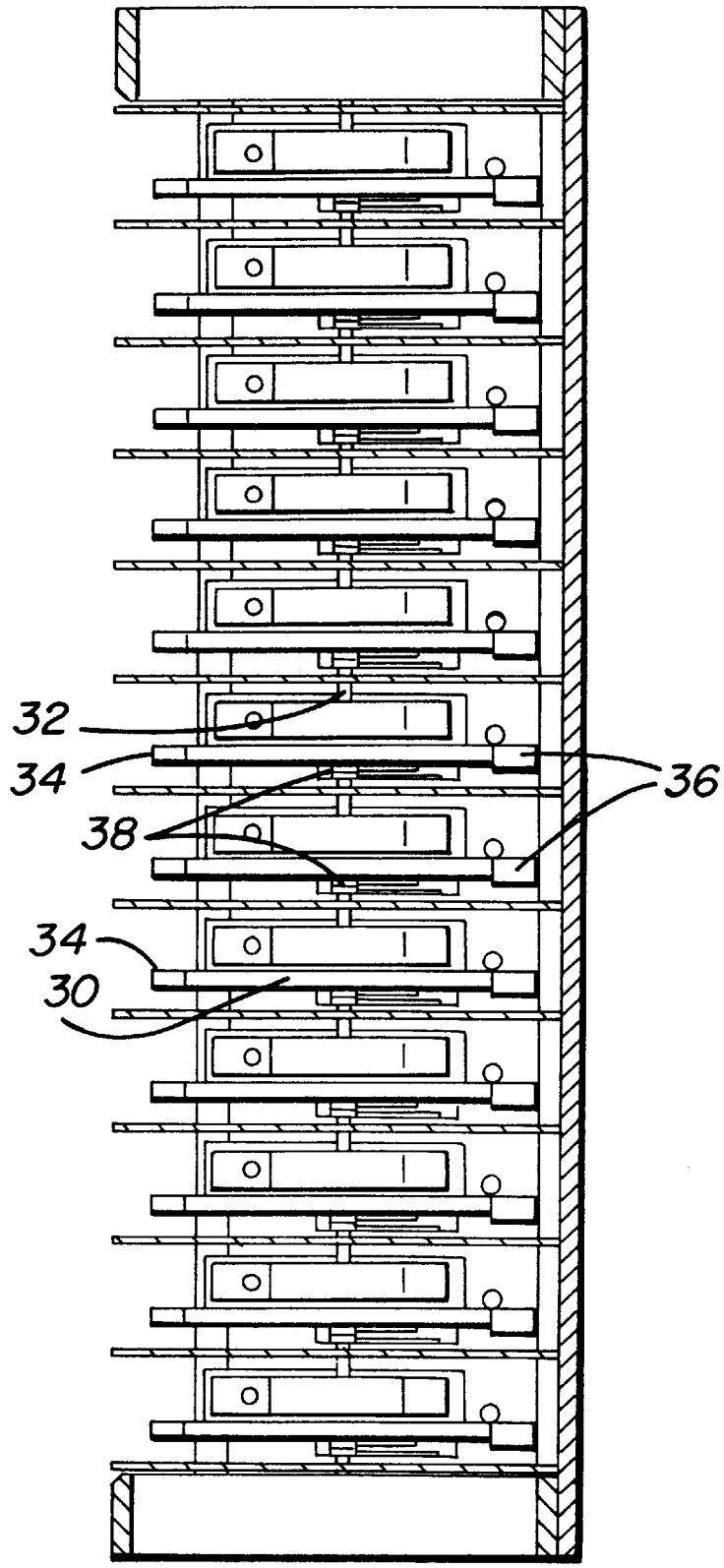
FIG. 3 is a cross-sectional side view through line 3—3 of FIG. 1a showing the locking device of the present invention.
Figure 4:
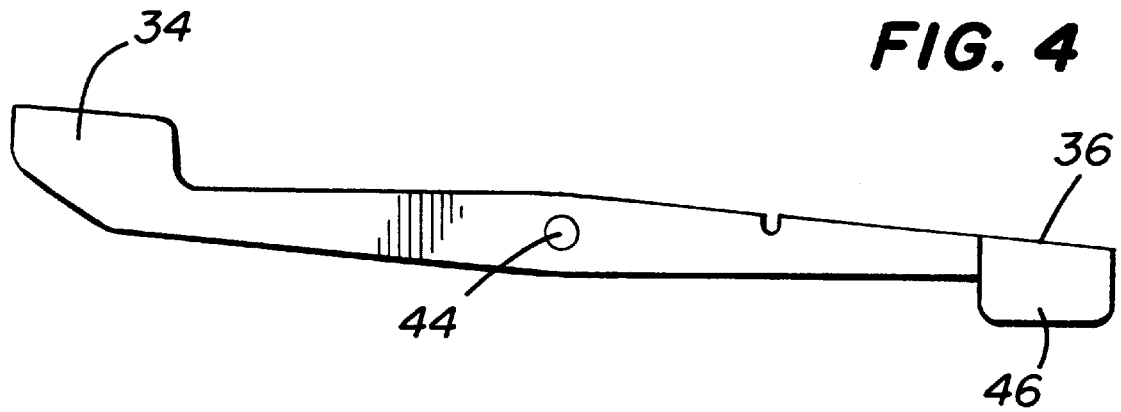
FIG. 4 is a side view of a cantilever according to the present invention.

FIG. 2 illustrates a cross-sectional top view through line 2—2 of FIG. 1a through one of the cassette bays 27, and FIG. 3 illustrates a cross-sectional side view through line 3—3 of FIG. 1a. A locking device according to the present invention is shown generally at 28, disposed adjacent to opposite side walls of the cassette bay 27. In a preferred embodiment, each cassette bay 27 includes two locking devices. However, it is understood that the present invention may alternatively operate with one cassette locking device in either side wall. The cassette locking devices in opposite side walls are identical to each other, and for convenience, discussion hereinafter refers to only a single cassette locking device.

The locking device 28 is comprised of a cantilever 30 pivotally mounted at the side wall by a shaft 32 (FIG. 3). Shaft 32 extends the entire length of magazine 20 through each cassette bay 27 to mount each of the cassette locking devices to the side wall. A force exerted in the direction of arrow A at load-receiving end 34 of cantilever 30 will cause a corresponding movement in the direction of arrow B at opposite end section 36. In the absence of any force at load-receiving end 34, cantilever 30 is biased by a spring 38 so that end section 36 is urged against cassette 26 into a detent 40 conventionally formed in both side edges of the cassette 26. In such a position, cassette 26 is positively restrained within the magazine cassette bay 27 against a rear face 42 of the cassette bay. Cassette 26 will remain locked within the cassette bay 27 until a force acts on cantilever 30 to remove end section 36 from detent 40. Where two cassette locking devices are included within each cassette bay 27, both cantilevers 30 must be disengaged as described above to free the cassette 26 from its cassette bay 27.

Figure 5:
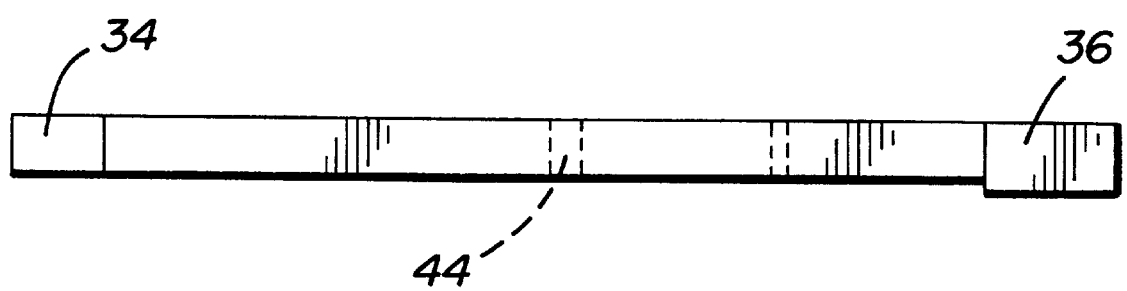
FIG. 5 is a top view of a cantilever according to the present invention.
Figure 5A:
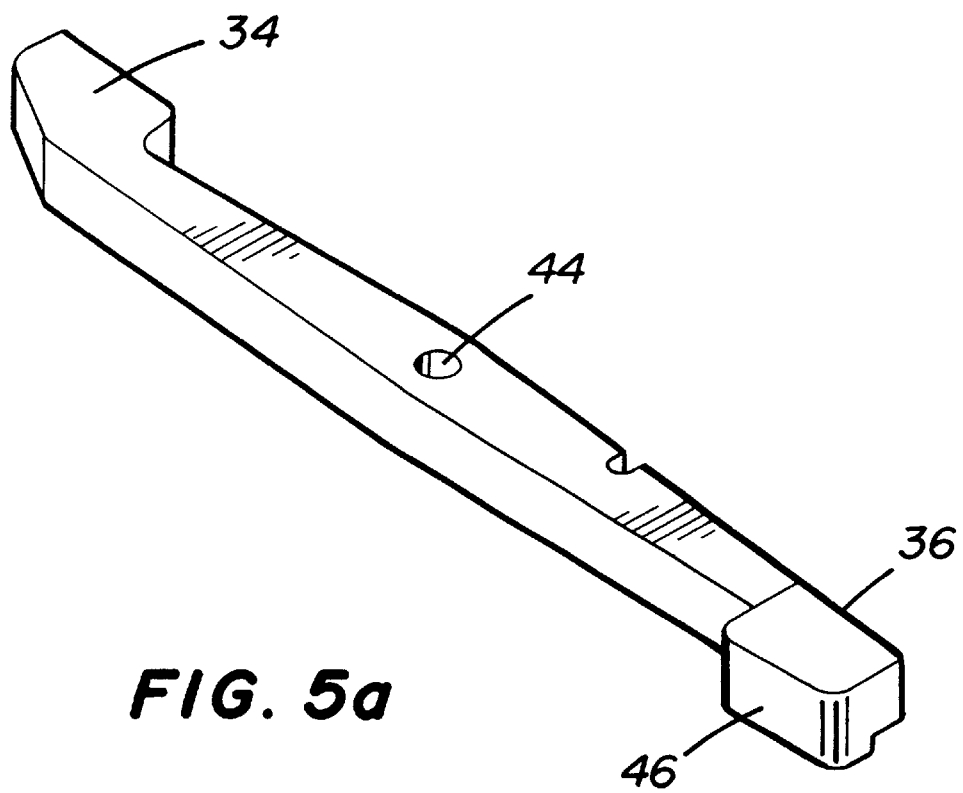
FIG. 5a is a perspective view of the cantilever shown in FIGS. 4 and 5.

As seen more clearly in FIGS. 4–8, cassette locking device 28 is comprised of cantilever 30 and spring 38. Cantilever 30 (FIGS. 4–5a) preferably includes load-receiving end 34 and end section 36 opposite thereto. Cantilever 30 is further provided with a hole 44 between load-receiving end 34 and end section 36 for receiving shaft 32 to thereby pivotally mount cantilever 30 within the cassette bay 27. End section 36 of cantilever 30 may include a tab 46 extending generally perpendicular to the length of the cantilever. Tab 46 is received within detent 40 to restrain the cassette 26 within bay 27. Cantilever 30 may be alternatively formed without tab 46. In this embodiment, the end section 36 may be angled with respect to the remainder of cantilever 30 for receipt within detent 40. It is understood that cantilever 30 may be formed to various known constructions at the side wall of the cassette bay 27 to latch cassette 26 within bay 27.

As described in U.S. Pat. No. 5,264,974, previously incorporated by reference, the cassette loading device includes an LED and phototransistor sensor assembly (not shown) mounted within the side of each cassette bay 27. The LED/sensor assembly is responsible for detecting the presence of a cassette 26 within a cassette bay 27. In order that the cassette locking device of the present invention not interfere with the LED/sensor assembly, the cantilever 30 may preferably be formed of a transparent polycarbonate such as that manufactured by General Electric Corp., Pittsfield, Mass. 01201. Light from the LED is therefore able to pass through the cantilever 30 relatively unobstructed. It will be understood by those in the art that the sensor design may be modified and that cantilever 30 may be formed from other rigid, durable materials such as, for example, aluminum or a high strength polymer.

Figure 7:
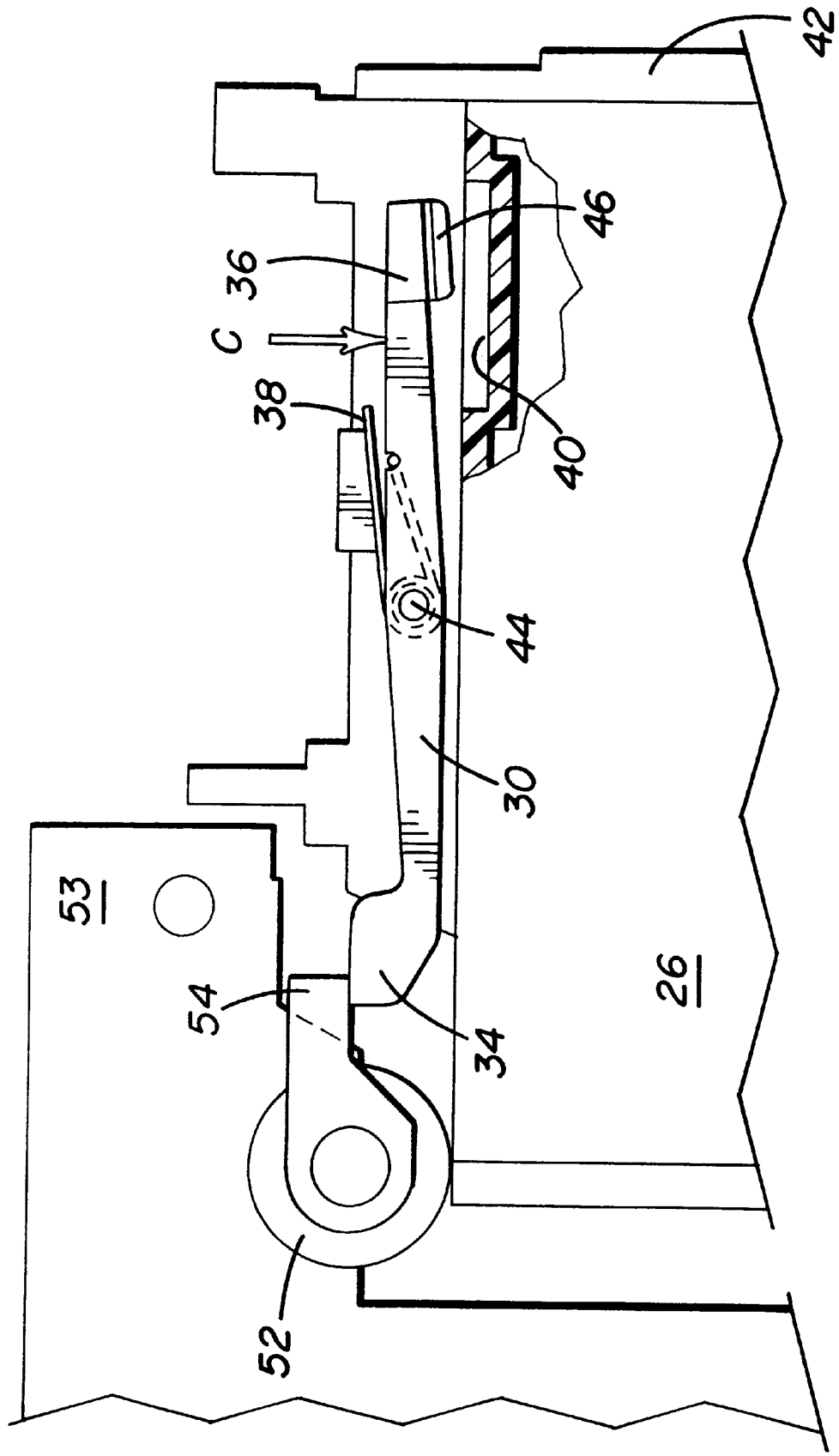
FIG. 7 is an enlarged top view of the present invention shown in the unlocked position.
Figure 8:
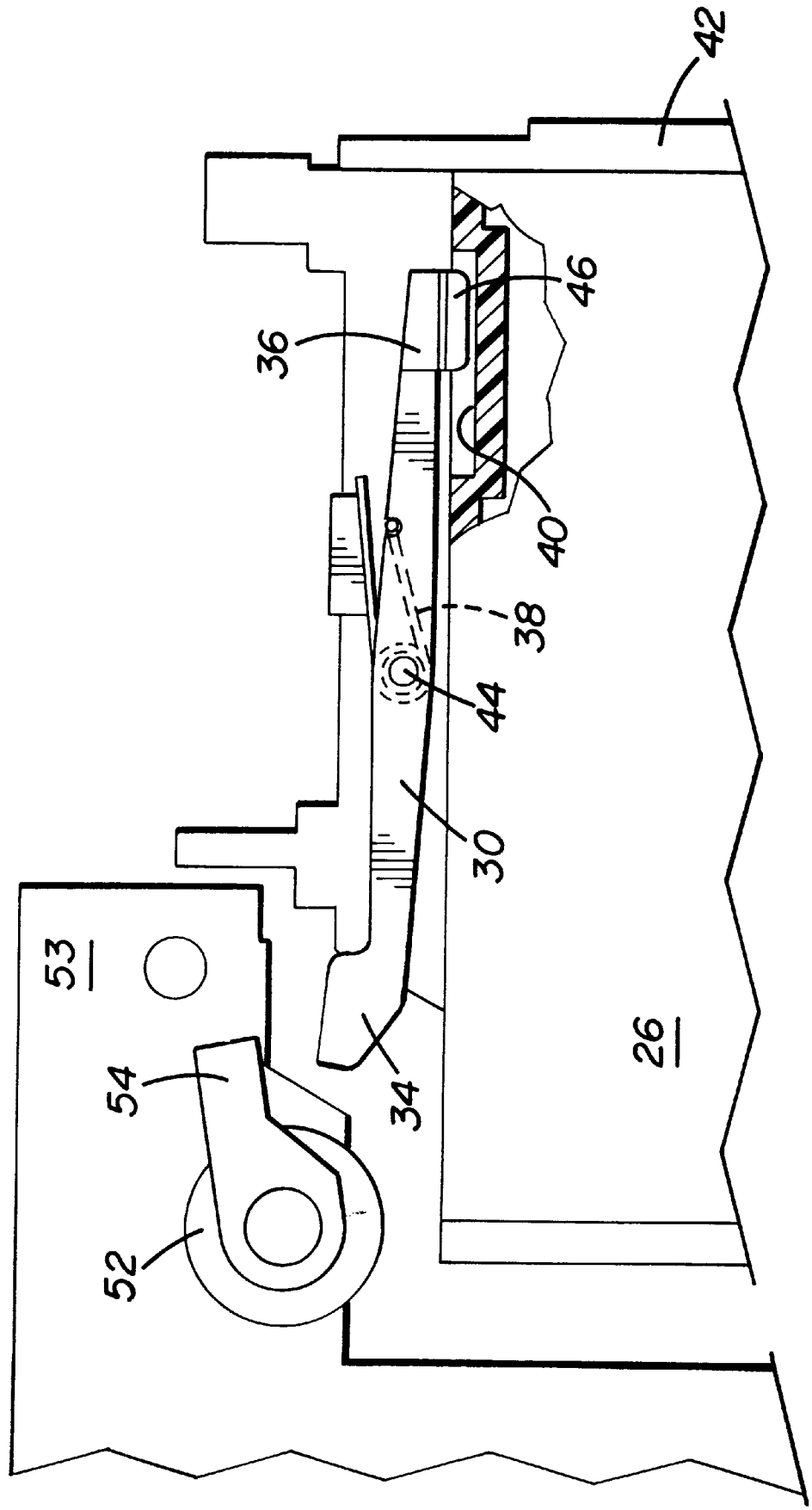
FIG. 8 is an enlarged top view of the present invention shown in the locked position.

Various spring mechanisms may be used to bias end section 36 of the cantilever 30 within detent 40. In a preferred embodiment, spring 38 may be a torsional spring as shown in FIGS. 7 and 8. Spring 38 imparts a force on cantilever 30 in the direction of arrow C (FIG. 7), to thereby bias end section 36 into detent 40. Thus, only a torque created by the force on load-receiving end 34 which exceeds the torque resulting from spring 38 will move end section 36 out of detent 40. It is understood that various other structures may be used to bias end section 36 into detent 40, such as for example a helical spring or springs located along the length of cantilever 30.

In a preferred embodiment, a cassette 26 will remain locked within a cassette bay 27 by cassette locking device 28 unless the end section 36 of the cantilever is manually biased out of the detent 40, or when a cassette 26 is to be loaded into a tape drive 24 by the cassette loading assembly. Cassette locking device 28 may be disengaged for loading of a cassette 26 into drive 24 as follows.

As taught in U.S. Pat. No. 5,264,974, the cassette loading assembly includes a cassette transfer assembly 53 (shown partially on FIGS. 7 and 8) for loading a cassette from the magazine into the tape drive. In operation, the magazine is vertically positioned so that a desired cassette within the magazine is aligned with the tape drive slot. The cassette transfer assembly 53 includes rotating pinch rollers 52 on opposite sides of the cassette bay 27, on either side of the cassette 26 to be loaded. To load a cassette, the transfer assembly 53 swings the pinch rollers inward to engage the cassette tape. Once in contact with the cassette, the pinch rollers 52 rotate against the sides of the cassette tape 26 to urge the tape into the tape drive slot.

According to the present invention as shown in FIGS. 7 and 8, the transfer assembly 53 further includes a bracket 54 mounted adjacent to one pinch roller 52 on each side of the cassette. While only one pinch roller and bracket are shown in FIGS. 7 and 8, it is understood that there is a second pinch roller and bracket not shown, on the opposite side of cassette bay 27. The pinch roller and bracket not shown are identical to and the mirror image of pinch roller 52 and bracket 54 of FIGS. 7 and 8. As pinch roller 52 and bracket 54 swing inward, but prior to pinch roller 52 contacting cassette 26, bracket 54 engages load-receiving end 34 of cantilever 30. Thus, as bracket 54 continues to move inward toward the cassette tape 26, bracket 54 exerts a force on load-receiving end 34 in the direction of arrow A (FIG. 2) so that tab 46 is pivoted out of detent 40. When pinch rollers 52 contact cassette 26, as seen in FIG. 7, tab 46 is no longer engaged within detent 40 and cassette 26 may be freely removed from the cassette bay 27 into the drive 24. Once cassette 26 is loaded into drive 24, pinch rollers 52 remain in their inwardly-biased position, and bracket 54 remains engaged with load-receiving end 34. Thus, while a cassette is positioned within the drive, its corresponding cantilever(s) 30 remain in the cassette release position shown in FIG. 7.

When a cassette tape is removed from the drive, the pinch rollers 52, rotating in an opposite direction than for cassette insertion, contact the sides of the cassette tape 26 to bias the cassette out of the drive 24. Once the cassette tape is completely restored within the magazine 20, the cassette transfer assembly 53 swings rollers 52 and bracket 54 back toward the side walls of the cassette bay, thereby releasing load-receiving end 34. The tab 46 is thereupon biased into detent 40 by spring 38 to once again positively restrain the cassette 26 within the magazine 20.

Each cassette bay 27 in magazine 20 preferably includes one or two cassette locking devices 28 according to the present invention. Thus, while bracket(s) 54 are acting on particular locking device(s) 28 to release the corresponding cassette 26 for loading into drive 24, the remaining cassettes in magazine 20 remain locked within magazine 20.

In the embodiments of the present invention described with reference to FIGS. 1–8, a plurality of cassettes 26 may be removed from magazine 20 at a given time, provided each of the cassette locking devices 28 associated with the plurality of cassettes 26 are first disengaged. However, it may be desirable to allow only one cassette locking device (e.g., the device associated with the cassette loaded within the drive 24) to be disengaged at a given time. Therefore, in an alternative embodiment of the present invention shown in FIGS. 9–11c, the present invention may include a lock control device which allows only one cantilever 30 within magazine 20 to be pivoted out of detent 40 at a given time, thereby locking all cassettes except one within the magazine 20.

FIGS. 9–11c show a cassette loading assembly as described above and further including a column 56 extending from the top to the bottom of the magazine 20. Column 56 may preferably be a hollow tube closed at the top and bottom, with a plurality of slots 58 formed along its length. A plurality of ball bearings 60 are provided within the interior of column 56. In one embodiment, the diameter of each spherical ball bearing 60 is preferably about 0.113 inches and the inner diameter of the column is preferably about 0.118 inches. Thus, the ball bearings 60 fit snugly within column 56, substantially in a straight line, one on top of another, along the length of the column. In an embodiment including twelve cassette bays within magazine 20, the height of the interior portion of column 56 is substantially 5.241 inches, and the combined height of all the bearings 60 within the column 56 is substantially 5.200 inches. Thus, owing to the difference in the height of the interior portion of the column 56 and the height of the bearings within column 56, a gap of at most 0.041 inches may separate any two adjoining bearings. It is important to note that if any two adjoining bearings are separated by this maximum distance of 0.041 inches, substantially no other gaps may be formed between any other pair of adjoining bearings within column 56. It is understood that the height and inner diameter of the column 56 may vary and still be within the scope of the invention. Moreover, it is understood that the number and diameter of the ball bearings 60 within the column 56 may vary depending on the height of the column 56.

Figure 9:
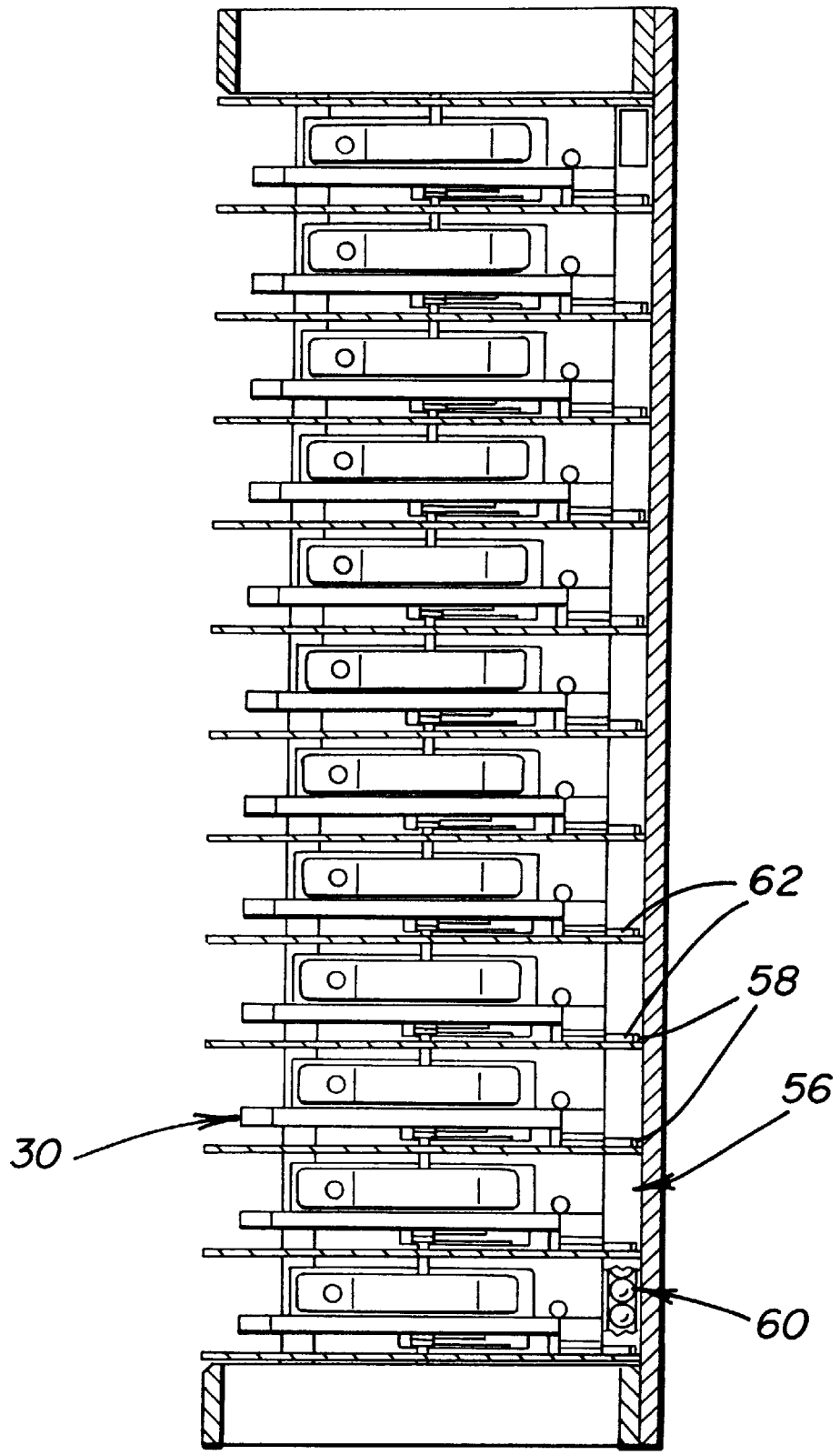
FIG. 9 is a side view of the present invention including a column for locking the cassettes within the magazine.
Figure 10A:
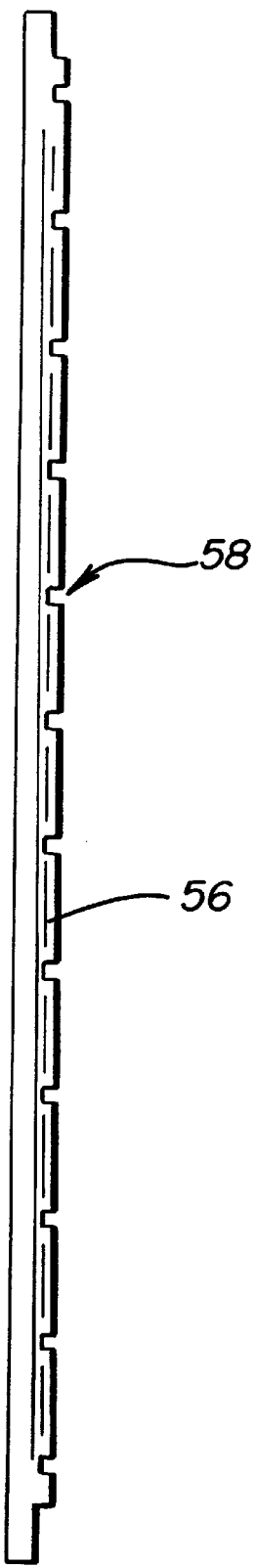
FIG. 10a is a side view of the column according to the present invention.
Figure 10B:
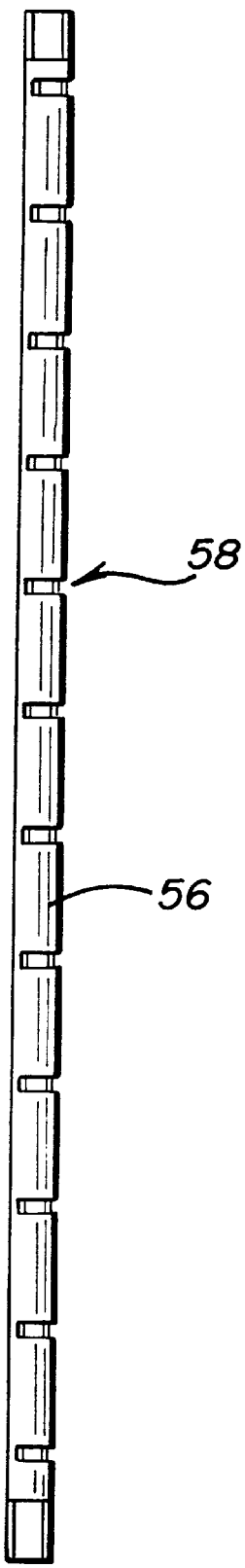
FIG. 10b is a front view of the column according to the present invention.
Figure 11A:
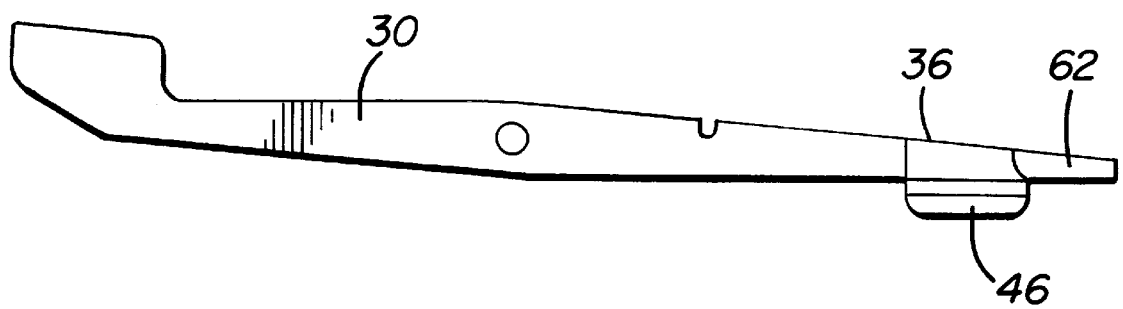
FIG. 11a shows a side view of cantilever according to the present invention including an extension.
Figure 11B:
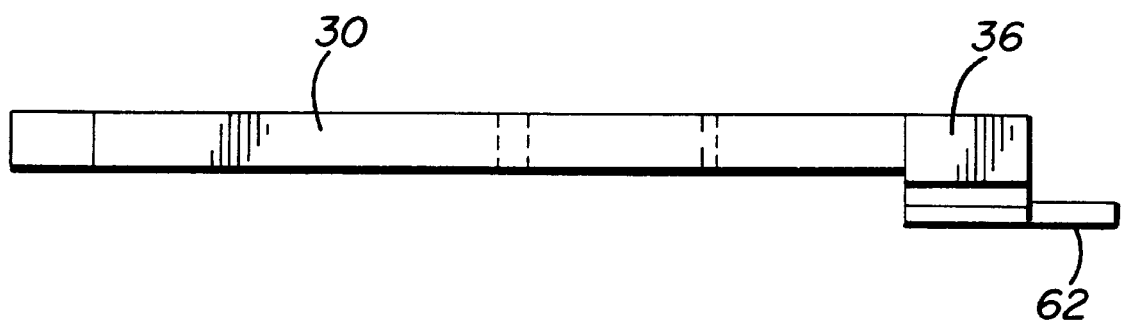
FIG. 11b shows a top view of cantilever according to the present invention including an extension.
Figure 11C:
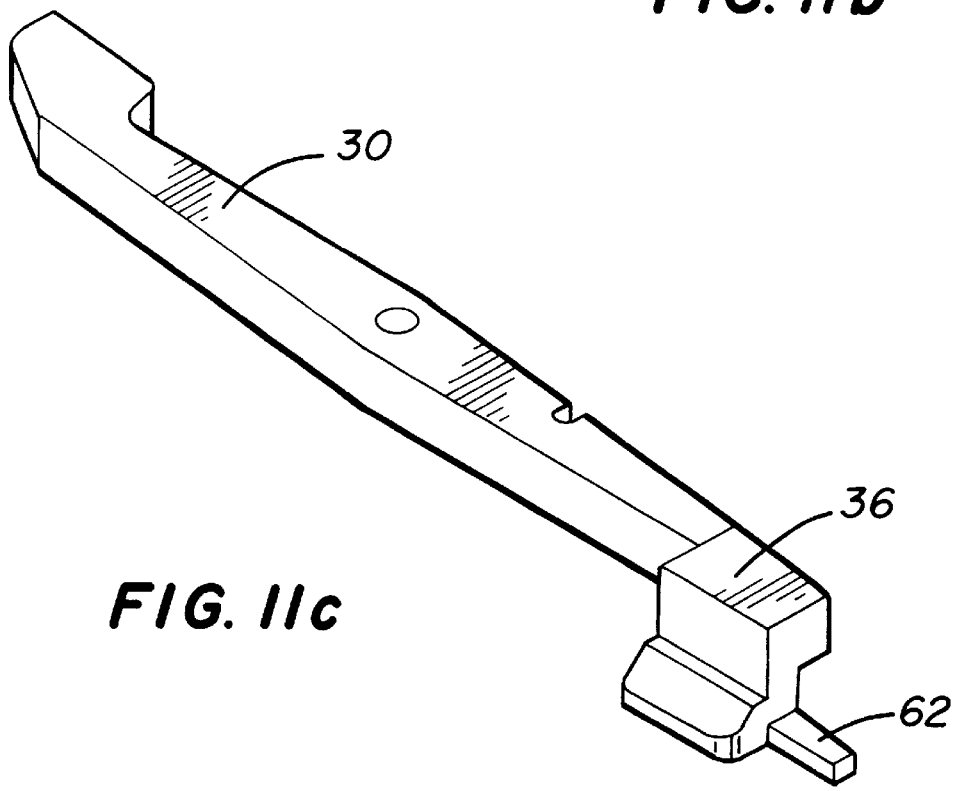
FIG. 11c is a perspective view of the cantilever shown in FIGS. 11a and 11b.

In the embodiment of the present invention shown in FIGS. 9–11c, each cantilever 30 may additionally include an extension 62 formed on the cantilever end section 36 adjacent to tab 46. Extension 62 may have a thickness of substantially 0.030 inches. There are at least as many slots 58 as there are extensions 62 on a given side of cassette bay 27, and the thickness of each slot 58 in column 56 may preferably be about 0.050 inches. As shown in FIG. 9, column 56 is fixedly provided within magazine 20 and the slots 58 are provided with respect to cantilevers 30 such that each slot 58 is aligned to receive one of the extensions 62 when end section 36 is pivoted out of the detent 40.

Figure 6:
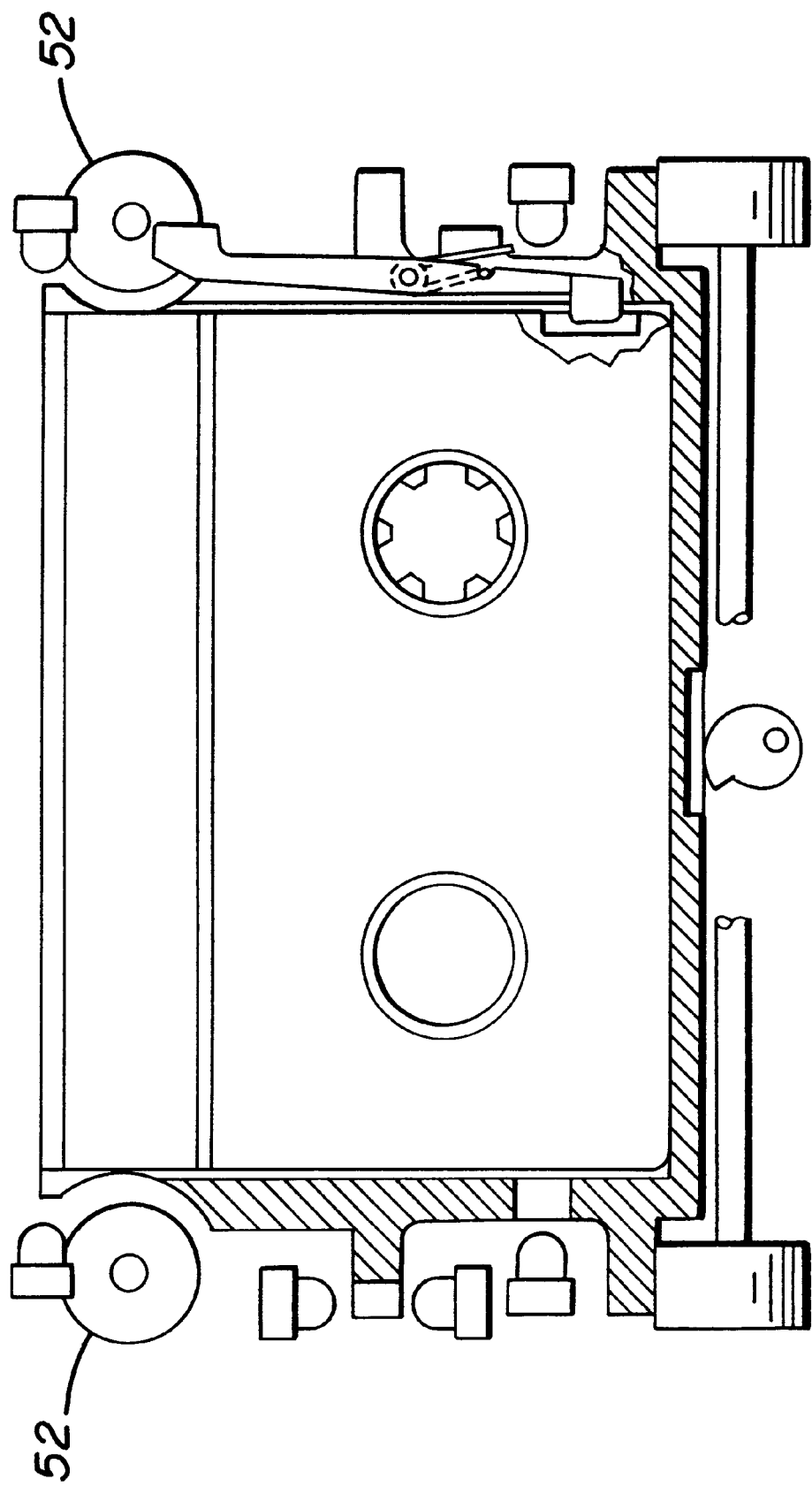
FIG. 6 is a top view of a cassette bay including a cassette tape and pinch rollers for loading the cassette into a tape drive.

When an end section 36 of a particular cantilever 30 is pivoted away from a detent 40, as explained with reference to FIGS. 6–8 above, the extension on that cantilever is received through the aligned slot 58 and into the interior of column 56. If no other extension 62 from another cassette locking device of the magazine is located within the column 56, extension 62 wedges between a pair of adjoining ball bearings 60. The pair of ball bearings may separate a sufficient amount to accommodate the extension due to the difference in the height of the interior of the column and the combined height of all the bearings together. However, once one extension 62 is located within column 56, there is not sufficient room within the column of ball bearings to accommodate a second extension therebetween. Thus, only one extension may be received within column 56 at a given time. If an attempt is made to dislodge a second cassette by pivoting end section 36 of a second cassette locking device out of a detent 40, the extension 62 of the second cassette locking device will be prevented from entering the column 56.

Detent 40 is conventionally formed approximately 0.050 inches deep. Therefore, end section 36 must travel a linear distance of at least 0.055 inches in order to clear tab 46 out of detent 40. When an extension 62 is properly located within the column 56 between a pair of ball bearings, the end section has traveled a linear distance of approximately 0.060 inches, and thus, the tab 46 is free of the detent 40 and the associated cassette 24 may be dislodged from the magazine 20. However, if an extension of a cantilever 30 is prevented from entering the column 56 (i.e., another extension 56 is already located within the column), then the maximum linear distance the end section of that cantilever may pivot is 0.015 inches. As this distance is insufficient to disengage the tab 46 from the detent 40, the cassette associated with that cantilever remains locked within the magazine. In this way, only one cassette 24 may be dislodged from magazine 20 at a given time. Of course, if it is desired to change the cassettes or otherwise remove a number of cassettes at the same time, column 56 may be removed from magazine 20 whereupon any number of the cassette locking devices may be disengaged to free the associated cassettes.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. A cassette transfer assembly, the assembly including a magazine for holding a plurality of cassettes in cassette bays of the magazine, and a loading means cooperating with the magazine to load a selected cassette of the plurality of cassettes into a tape drive, comprising:

a plurality of locking devices for restraining the plurality of cassettes in the plurality of cassette bays, a cassette locking device of said plurality of locking devices provided in each cassette bay of the plurality of cassette bays, said locking device including:

a cantilever pivotally mounted adjacent to a side of said each cassette bay, said cassette locking device having a first state wherein an end section of said cantilever engages a cassette to restrain the cassette within a cassette bay and a second state wherein said end section does not engage the cassette; and spring means adjacent to said cantilever for biasing said locking device into said first state;

wherein the loading means includes biasing means for moving said locking device engaging the selected cassette into said second state while others of the plurality of locking devices are provided in said first state; and means for preventing more than one cassette locking device of said plurality of cassette locking devices from occupying said second state at the same time.

2. A magazine for holding a plurality of cassettes in cassette bays of the magazine, the magazine cooperating with a loading means to load a selected cassette of the plurality of cassettes into a tape drive, comprising:

a plurality of locking devices for restraining the plurality of cassettes in the cassette bays, each said locking device having a first state wherein said locking device restrains a cassette of said plurality of cassettes within the magazine, and each said locking device having a second state wherein said locking device is disengaged from said cassette within said magazine;

a lock control device mounted within the magazine through each of the cassette bays proximate to each said locking device, for cooperating with said plurality of locking devices to allow only one of said plurality of locking devices to occupy said second state at a given time.

3. A magazine for holding a plurality of cassettes in cassette bays of the magazine as recited in claim 2, wherein each said locking device comprises latch means having an end engaging said cassette in said first state, said end moving away from said cassette upon application of a biasing force to move said locking device into said second state.

4. A magazine for holding a plurality of cassettes in cassette bays of the magazine as recited in claim 3, wherein said end engages said cassette in said first state by resting in a detent formed in a side of said cassette.

5. A magazine for holding a plurality of cassettes in cassette bays of the magazine as recited in claim 3, wherein, upon a first locking device of said plurality of locking devices being in said second state, said lock control device prevents said end of said latch means of a second locking device from moving away from a second cassette with which said end is engaged.

6. A magazine for holding a plurality of cassettes in cassette bays of the magazine as recited in claim 2, wherein said locking device comprises latch means having an end, said end engaging said cassette in said first state to restrain said cassette within the magazine, and said end disengaged from said cassette and located within said lock control device in said second state.

7. A magazine for holding a plurality of cassettes in cassette bays of the magazine as recited in claim 6, said lock control device including means for allowing said end of said latch means from one of said locking devices to be located within said lock control device and for blocking said end of said latch means from others of said locking devices from being located within said lock control device when said end of said one of said locking devices is located within said lock control device.

8. A magazine for holding a plurality of cassettes in cassette bays of the magazine as recited in claim 7, wherein said end cannot disengage from said cassette if said end is blocked from being located within said lock control device.

9. A magazine for holding a plurality of cassettes in cassette bays of the magazine as recited in claim 7,
   wherein said allowing and blocking means comprises a column of ball bearings provided within an enclosed chamber of said lock control device, said enclosed chamber having a plurality of slots for accepting said end on each of said plurality of locking devices, said ball bearings provided within said chamber such that, upon separation of an adjoining pair of ball bearings to locate said end of said one of said locking devices therebetween, there is insufficient space for another pair of ball bearings to separate to locate said end of said others of said locking devices therebetween.

10. A magazine for holding a plurality of cassettes in cassette bays of the magazine, the magazine cooperating with a loading means to load a selected cassette of the plurality of cassettes into a tape drive, comprising:
   a plurality of locking devices for restraining the plurality of cassettes in the cassette bays, each locking device of said plurality of locking devices including a latch means having an end, a locking device of said plurality of locking devices having a first position wherein said end engages an associated cassette to restrain said associated cassette in the magazine, and said locking device having a second position wherein said end is moved away from said associated cassette to allow said associated cassette to be removed from the magazine; and
   a lock control device provided within the magazine in each of the cassette bays in close proximity to said end of said each locking device, said lock control device physically blocking said end of a first locking device of said plurality of locking devices from moving out of said first position when a second of said locking devices of said plurality of locking devices is in said second position.

11. A magazine for holding a plurality of cassettes in cassette bays of the magazine as recited in claim 10, said lock control device comprising:
   a column extending from a top of the magazine to a bottom of the magazine through each cassette bay, said column having a hollow interior and sealed at a top and bottom of said column, said column further having a plurality of slots along a length of said column, said end being received through one of said plurality of slots into said interior when said second locking device is in said second position;
   a plurality of ball bearings within said interior aligned in a single row one on top of another along said length of said column;
   wherein said plurality of ball bearings are provided within said interior such that said end of said second locking device is located between a pair of ball bearings in said column when said second locking device is in said second position, there being insufficient space in said column between the plurality of ball bearings to accommodate said end of another of said plurality of locking devices in addition to said second locking device; and
   wherein said end cannot disengage from said cassette if said end is blocked from being located within said column between the plurality of ball bearings.

12. A magazine for holding a plurality of cassettes in cassette bays of the magazine, the magazine cooperating with a loading means to load a selected cassette of the plurality of cassettes into a tape drive, comprising:
   a plurality of locking devices for restraining the plurality of cassettes in the cassette bays, each locking device of said plurality of locking devices including a latch means having an end, a locking device of said plurality of locking devices having a first position wherein said end engages an associated cassette to restrain said associated cassette in the magazine, and said locking device having a second position wherein said end is moved away from said associated cassette to allow said associated cassette to be removed from the magazine; and
   a lock control device extending from a top of the magazine to a bottom of the magazine through each cassette bay, said lock control device including,
      a column having a hollow interior and sealed at a top and bottom of said column, said column further having a plurality of slots along a length of said column, said end being received through one of said plurality of slots into said interior when said locking device is in said second position;
      a plurality of ball bearings within said interior aligned in a single row one on top of another along said length of said column;
      wherein said plurality of ball bearings are provided within said interior such that said end of a first locking device of the plurality of locking devices is located between a pair of ball bearings in said column when said first locking device is in said second position, there being insufficient space in said column between the plurality of ball bearings to accommodate said end of another of said plurality of locking devices in addition to said first locking device; and
      wherein said end cannot disengage from said cassette if said end is blocked from being located within said column between the plurality of ball bearings.

* * * * *